United States Patent [19]
Ikeda et al.

[11] Patent Number: 5,633,772
[45] Date of Patent: May 27, 1997

[54] DISK CARTRIDGE WITH FIBROUS CLEANING MEMBER HAVING SET DENSITY RATE OF CHANGE

[75] Inventors: Hiroshi Ikeda; Mami Murata, both of Tochigi-ken, Japan

[73] Assignee: Kao Corporation, Tokyo, Japan

[21] Appl. No.: 305,705

[22] Filed: Sep. 14, 1994

[30] Foreign Application Priority Data

Sep. 24, 1993 [JP] Japan .................................. 5-238234
Jun. 14, 1994 [JP] Japan .................................. 6-132204

[51] Int. Cl.$^6$ ........................... G11B 23/03; G11B 23/50
[52] U.S. Cl. ................................... 360/133; 360/137
[58] Field of Search ............................ 360/133, 137; 428/218, 219, 224, 303

[56] References Cited

U.S. PATENT DOCUMENTS 5,216,566  6/1993  Obara et al. ............................ 360/133
5,311,389  5/1994  Howey ..................................... 360/133

*Primary Examiner*—Craig A. Renner
*Attorney, Agent, or Firm*—Birch, Stewart, Kolasch & Birch, LLP

[57] ABSTRACT

A cleaning member is used for cleaning a magnetic disk by rubbing the cleaning member in a sliding manner against the surface of the magnetic disk. The cleaning member is a sheet-like fibrous member having a density of no more than 0.10 g/cm$^3$ at a load of 4.4 gf/cm$^2$; with the rate of change of the density over a load range of 0.1–4.4 gf/cm$^2$ being at least $4 \times 10^{-3}$ (g/cm$^3$)/(gf/cm$^2$).

2 Claims, 2 Drawing Sheets

DISK CARTRIDGE WITH FIBROUS CLEANING MEMBER HAVING SET DENSITY RATE OF CHANGE

BACKGROUND OF THE INVENTION

1. Field of the Invention

The present invention relates to a disk cartridge. More particularly, the present invention is concerned with a disk cartridge which provides improved cleanability of its disk by a cleaning member, and which is further capable of maintaining an appropriate torque of the disk resulting from the rubbing friction with the cleaning member.

2. Description of the Related Art

Generally disk cartridges have a structure wherein a cleaning member for cleaning a magnetic disk is disposed on the inner surface of the cartridge body. In addition, the cartridge body comprises top and bottom shells, the inner surface of at least one of which has a cleaning member attached thereon.

Such a cleaning member is composed of a fibrous sheet, and is rubbed in a sliding manner against the surface of the magnetic disk for the collection of dust, etc. from the surface. Further, in the case of disk cartridges for 3.5-inch magnetic disks, a lifter is installed between the cleaning member and the inner surface of the cartridge body. The lifter serves to push against part of the cleaning member in a curved manner toward the surface of the magnetic disk to allow the curved-out portion to satisfactorily clean the surface of the magnetic disk.

In the disk cartridges of the prior art, however, the density of the cleaning member is a relatively high density of about $0.20$ g/cm$^3$ at a load of $4.4$ gf/cm$^2$, and thus the torque applied to the magnetic disk tends to change considerably due to the variations in the thickness of the member.

Furthermore, the most probable pressing force of around $4$–$5$ gf/cm$^2$ of the cleaning member on the magnetic disk through the use of a lifter or the like for improving the cleaning efficacy may cause an excessive torque to be applied to the magnetic disk. For this reason, the thickness of the cleaning member has been reduced to reduce contact of the sections of the lifter other than that on which the lifter is installed, thereby resulting in improvement of the cleaning efficacy of the lifter-installed section alone. There are some cases, however, where the restorability of the lifter is reduced with the passage of time, and thus the cleaning performance of the cleaning member is correspondingly reduced.

In addition, with warping of the shells, etc., the pressing force of the cleaning member on the magnetic disk sometimes reaches approximately $10$ gf/cm$^2$. This produces a drawback with rechargeable word processors and the like in that much power is consumed during operation, resulting in an accelerated draining of the battery.

SUMMARY OF THE INVENTION

Accordingly, it is an object of the present invention to provide a disk cartridge which provides an improved cleanability of disks, and which further allows the torque resulting from the rubbing friction between the cleaning member and the disk to be maintained at an appropriate level.

The present invention has achieved the above object by providing a disk cartridge with a sheet-like fibrous cleaning member for disk-cleaning disposed on the inner surface of the cartridge body, said cleaning member being characterized in that the density of the cleaning member is $0.10$ g/cm$^3$ or less at a load of $4.4$ gf/cm$^2$, and the rate of change of the density over a load range of $0.1$–$4.4$ gf/cm$^2$ is $4.0\times10^{-3}$ (g/cm$^3$)/(gf/cm$^2$) or more.

The disk cartridge according to the present invention is capable of improving the cleanability of a disk and also of maintaining at an appropriate level the torque resulting from the rubbing friction between the cleaning member and the disk.

BRIEF DESCRIPTION OF THE DRAWINGS

The present invention will become more fully understood from the detailed description given hereinbelow and the accompanying drawings which are given by way of illustration only, and thus are not limitation of the present invention, and wherein.

DETAILED DESCRIPTION OF THE INVENTION

The disk cartridge of the present invention will be explained in more detail below with reference to the attached drawings.

Figure 1:
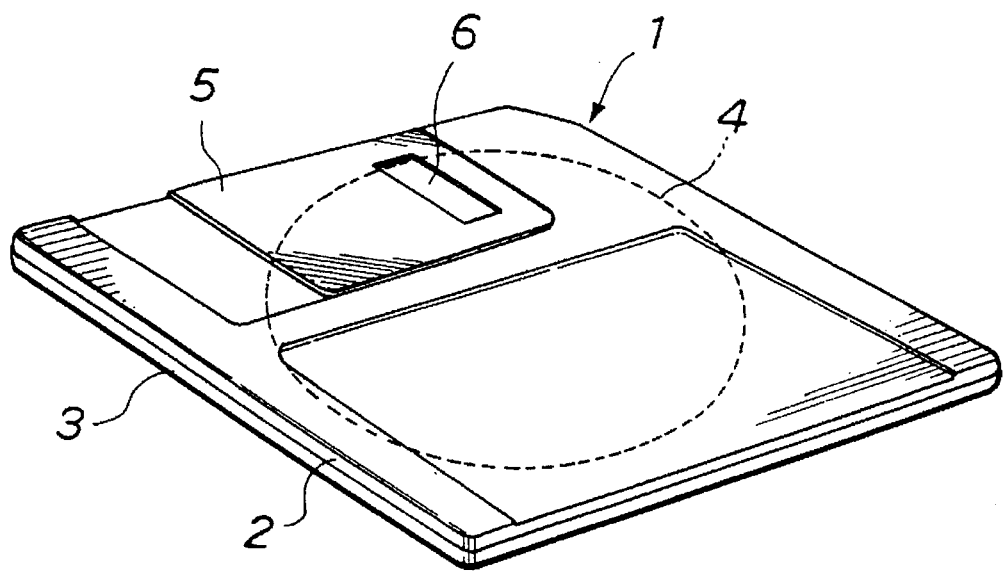
FIG. 1 is a perspective view of the cartridge body of a disk cartridge according to the present invention.
Figure 2:
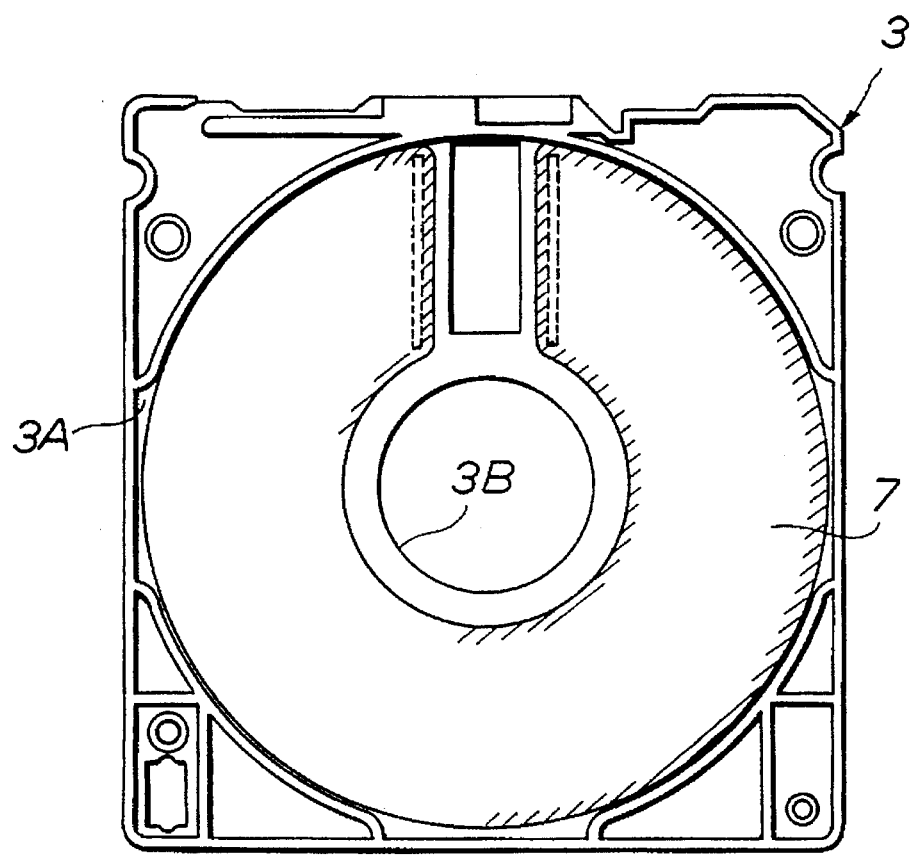
FIG. 2 is an inside view of the cartridge body shown in FIG. 1.
Figure 3:
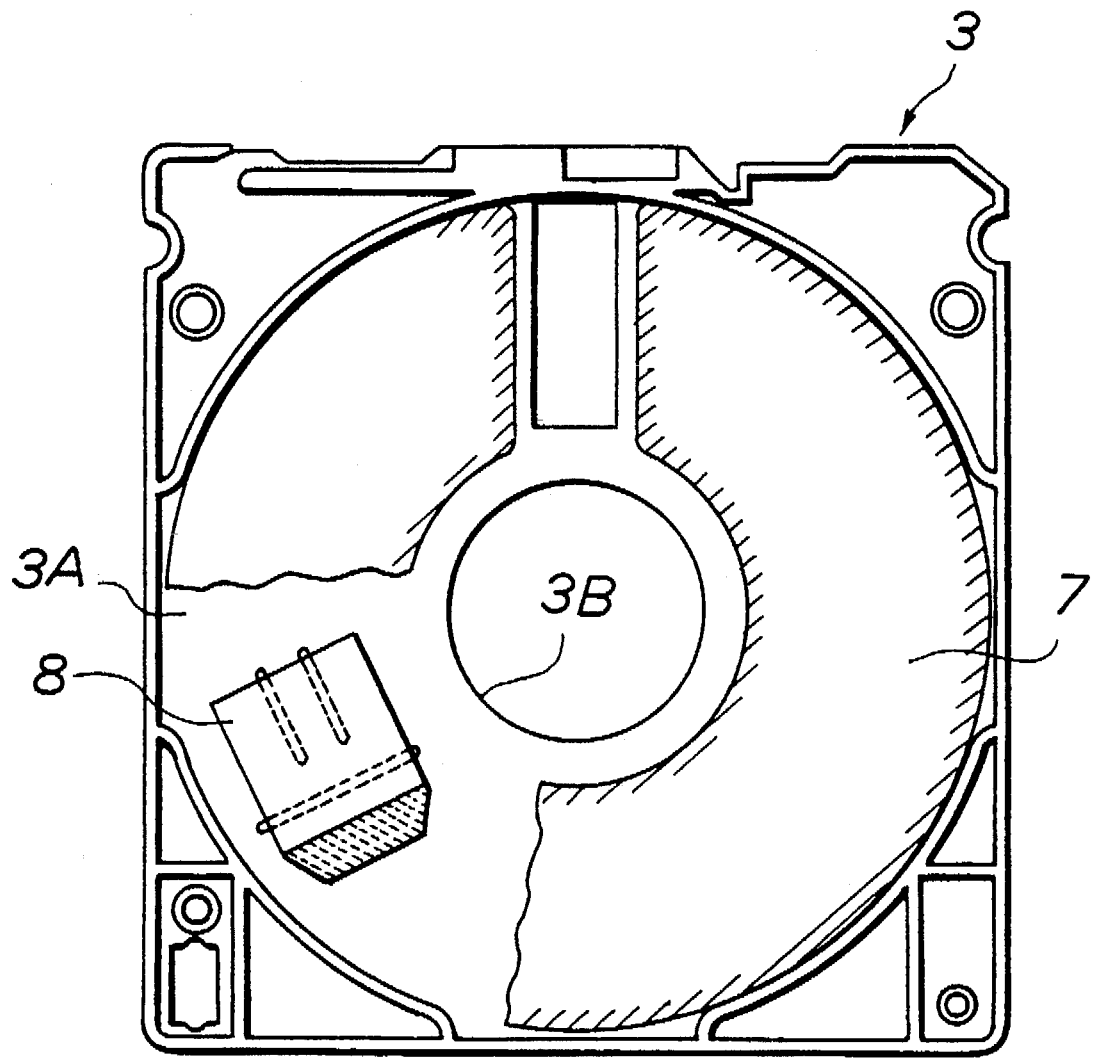
FIG. 3 is an inside view of another embodiment of the cartridge body of the disk cartridge according to the present invention.

FIG. 1 and FIG. 2 are perspective and inside views of the cartridge body of a disk cartridge according to the present invention. On the other hand, FIG. 3 is an inside view of another embodiment of the cartridge body of the disk cartridge according to the present invention. Here it is to be noted that the present invention may be applied to disk cartridges of various sizes, without being limited to the 3.5-inch disk cartridges shown in FIGS. 1–3, and the disk cartridges of various sizes to which the present invention is applicable may be basically constructed in the same manner as conventional disk cartridges with the same respective sizes.

As shown in FIGS. 1–3, the disk cartridge of the present invention comprises a sheet-like fibrous cleaning member 7 for cleaning a magnetic disk 4, disposed on the inner surface of a cartridge body 1, and this construction is the same as that of publicly known disk cartridges.

With this construction, the density of the cleaning member 7 of the disk cartridge according to the present invention is $0.10$ g/cm$^3$ or less, preferably $0.05$ to $0.10$ g/cm$^3$, at a load of $4.4$ gf/cm$^2$, and the rate of change of its density is $4.0\times10^{-3}$ (g/cm$^3$)/(gf/cm$^2$) or more over a load range of $0.1$–$4.4$ gf/cm$^2$.

A more detailed explanation of the disk cartridge according to the present invention, as shown in FIG. 1, comprises a cartridge body 1 having a top shell 2 and a bottom shell 3, which holds a magnetic disk 4 in a rotatable manner. A sliding shutter 5 is provided straddling the top shell 2 and the bottom shell 3, and a window 6 is provided in the shutter 5. The magnetic disk 4 contacts the head of the unit through the window 6, while a spindle of the unit (not shown) is inserted into a central opening 3B of the bottom shell 3, thereby allowing rotation around the spindle.

As shown in FIG. 2 and FIG. 3, the bottom shell 3 holds the roughly C-shaped cleaning member 7 which is attached to the inner surface 3A except at the section of the head window 6. In addition, as shown in FIG. 3, a lifter 8 is provided between the inner surface 3A of the shell 3 and the cleaning member 7, and occasionally the cleaning member 7 is pressed against the surface of the magnetic disk 4 with the lifter 8. In this connection, the cleaning member 7 is preferably provided on the inner surface of each of the top and bottom shells 2, 3.

The density of the cleaning member 7 should be 0.10 $g/cm^3$ or less at a load of 4.4 $gf/cm^2$.

If the above density is greater than 0.10 $g/cm^3$ at a load of 4.4 $gf/cm^2$, then proper cleaning performance becomes difficult with a magnetic disk torque within specifications.

At a load within the range of 0.1–4.4 $gf/cm^2$, the rate of change of the density is $4.0 \times 10^{-3}$ $(g/cm^3)/(gf/cm^2)$ or greater, and preferably $7.0 \times 10^{-3}$–$1.6 \times 10^{-2}$ $(g/cm^3)/(gf/cm^2)$.

If the above rate of change of the density is less than $4.0 \times 10^{-3}$ $(g/cm^3)/(gf/cm^2)$, then the shells warp, and furthermore, if the pressing force of the cleaning member on the magnetic disk is approximately 10 $gf/cm^2$, there is a risk that the magnetic disk torque will exceed specifications.

Here, the term "rate of change of the density" refers to one of the parameters of the degree of contact between a magnetic disk and its cleaning member, and this measurement determines whether the performance of the cleaning member is acceptable or not.

This "rate of change of the density" may be measured by, for example, the following Method 1. Method 1: With a measuring apparatus such as "KES-FB3" (trade name of a Kawabata evaluation system manufactured by Kato Tech Co. Ltd.), measurement is made of the load on the cleaning member and its thickness, and then a graph is prepared with the load plotted along the axis of ordinates and the thickness along that of abscissae, to determine their relationship, and the rate of change of the density discussed above is determined on the basis of the graph.

Accordingly, the density increases as the load is enlarged, meaning that a higher "rate of change of the density" reflects a larger rate of density increase relative to load increase.

The cleaning member 7 is composed of a sheet-like fibrous material, and any conventional cleaning material may be used without any particular exception. As the sheet-like material there may be used, for example, any of the already publicly known nonwoven fabrics, woven fabrics, sheet materials, etc. This material can include, for example, polyolefins such as polyethylene, polypropylene, etc., polyesters such as polyethylene terephthalate (PET), etc. polyamide fibers such as nylon, rayon, etc. and combinations thereof with each other and other synthetic and natural fibers.

Of the above listed sheet-like materials, a nonwoven fabric is preferably used.

The nonwoven fabric includes thermally bonded types, chemically bonded types, melt blown types, span laced types, span bonded types, felted types, needle punched types and combinations thereof. In order to obtain a cleaning member meeting the density requirements specified above, a chemically bonded type of nonwoven fabric is particularly preferred.

The chemically bonded types of nonwoven fabric comprises a material satisfying the above requirements and a chemical binder. Illustrative of the chemical binder is styrene-butadiene rubber (SBR), nitrile butadiene rubber (NBR), ethylene-vinyl acetate (EVA), ethylene-vinyl chloride (EVCL), polyvinyl chloride (PVC), acrylic/acrylic copolymer, polyvinyl acetate (PVA), polyvinyl alcohol, polyester (e.g., pET)/copolymer, an adherent material composed of an elastomer and an analog thereof.

Furthermore, to meet the above requirements for the density and for the rate of change of the density, the thickness of the above fiber used as the material for construction of the nonwoven fabric is preferably about 0.5–5 deniers, while the quantity of fiber used is preferably 9–40 $g/m^2$ and more preferably 10–35 $g/m^2$.

A polydimethylsiloxane base treatment may be added to the material during the process of manufacturing the cleaning member 7, wherein the quantity of the treatment added is preferably 0.01–1 g and more preferably 0.03–0.5 g per kg of the material.

Preferred embodiments of the above polydimethylsiloxane base treatment include a modified linear polydimethylsiloxane having a viscosity of 50–3000 cSt at a temperature of 25° C., and provided that the molecule has at least one hydroxyl group, amino group, mercapto group, carboxyl group, alpha-methylstyrene group, alpha-olefin group, fluorine, alkyl group, higher fatty acid group, methacrylic group, acrylic group, polyether group or epoxy group.

In addition, in place of or in combination with the polydimethylsiloxane base treatment, a fatty acid such as oleic acid may be used as the base treatment. If a fatty acid is added, then it is preferred to be added in an amount of 80 mg to 5 g per kg of the material.

The addition of such a base treatment serves to improve the dust collection performance of the cleaning member 7.

With a cartridge constructed in this manner, the thickness of the cleaning member 7 varies considerably depending on the load placed thereon. The torque exerted on the magnetic disk 4 cannot become excessive even with a load on the cleaning member 7 which ranges from a contact pressure of 0.1 $gf/cm^2$ to allow cleaning of the magnetic disk 4 to a pressing force of 4.4 $gf/cm^2$ by the action of the lifter 8. Further, even if the lifter 8 becomes worn with the passage of time, and eventually loses its restorability, the rest of the cleaning member 7 is in close contact with the disk, and thus the cleaning performance is not impaired. Accordingly, occasional and satisfactory cleaning performance can be accomplished without the pressing force from the lifter or the like.

Also, even with the pressing force of approximately 10 $gf/cm^2$ by the cleaning member 7 on the magnetic disk 4 as a result of warping of the shells 2, 3, etc., the thickness of the cleaning member 7 correspondingly changes, and thus an increase of the torque on the magnetic disk 4 may be reduced to a minimum.

Hereunder, the present invention will be explained more concretely with reference to the following examples and comparisons, without limiting the scope of the present invention.

(Examples and Comparisons)

Cleaning members 1–6 are obtained using the chemically bonded types of nonwoven fabrics 1–6 listed in Table 1, respectively. Here, the nonwoven fabrics 1–6 are obtained in the same manner as in the manufacturing of commonly used, publicly known chemically bonded types of nonwoven fabric.

TABLE 1

| Nonwoven fabric | and its composition | Fiber thickness | Quantity of fiber used (g/m²) | Binder | Fiber/ Binder (w/w %) |
|---|---|---|---|---|---|
| 1 | Rayon/ PET*1 = 50/50 (w/w %) | 1.5d | 73 | SBR*2 | 65/35 |
| 2 | Rayon/ PET*1 = 50/50 (w/w %) | 1.5d | 38 | SBR*2 | 82/18 |
| 3 | Rayon/ PET*1 = 50/50 (w/w %) | 1.5d | 45 | SBR*2 | 82/18 |
| 4 | Rayon/ PET*1 = 50/50 (w/w %) | 1.2d | 34 | SBR*2 | 85/15 |
| 5 | Rayon/ PET*1 = 50/50 (w/w %) | 1.5d | 45 | SBR*2 | 85/15 |
| 6 | Rayon/ PET*1 = 50/50 (w/w %) | 3.0d | 10 | SBR*2 | 88/12 |

*1: Polyethylene terephthalate
*2: Styrene-butadiene rubber, styrene/butadiene = 50/50 (w/w %)

For each of the resulting cleaning members 1–6, easurement is made of the density at a load of 4.4 gf/cm² the density at a load of 0.1 gf/cm², the thickness at a load of 0.1 gf/cm² and the rate of change of density over a load range of 0.1–4.4 gf/cm². The results are shown in Table 2.

TABLE 2

| | Cleaning member No. | | | | | |
|---|---|---|---|---|---|---|
| | No. 1 | No. 2 | No. 3 | No. 4 | No. 5 | No. 6 |
| | | | Nonwoven fabric | | | |
| | 1 | 2 | 3 | 4 | 5 | 6 |
| Density at 4.4 gf/cm² (g/cm³) | 0.20 | 0.11 | 0.11 | 0.10 | 0.10 | 0.05 |
| Density at 0.1 gf/cm² (g/cm³) | 0.187 | 0.092 | 0.092 | 0.067 | 0.088 | 0.018 |
| Thickness at 0.1 gf/cm² (μm) | 600 | 500 | 600 | 600 | 600 | 600 |
| Rate of change of the density over 0.1–4.4 gf/cm² range [(g/cm³)/(gf/cm²)] | $3.0 \times 10^{-3}$ | $4.2 \times 10^{-3}$ | $4.2 \times 10^{-3}$ | $7.7 \times 10^{-3}$ | $2.8 \times 10^{-3}$ | $7.4 \times 10^{-3}$ |

Disk cartridges with the structure shown in FIG. 1 are then assembled using the respective cleaning members.

For each of the resulting disk cartridges, the torque and the cleanability of the magnetic disks are measured, with the results shown in Table 3. Here, the torque is a running torque, while the cleanability is shown as a percentage of the number of dust particles collected by the cleaning member during one turn of the disk, relative to the number of dust particles which passed through the head opening. The specifications for the running torque is 0.25 N·cm or less, and 100% cleanability means collection of all the dust.

In Table 3, Samples 1–3 and 5 are Comparison Examples, while Samples 4 and 6 are Working Examples.

TABLE 3

| Sample No. | No. 1 | No. 2 | No. 3 | No. 4 | No. 5 | No. 6 |
|---|---|---|---|---|---|---|
| Magnetic disk torque (N · cm) | 0.40 | 0.23 | 0.28 | 0.23 | 0.26 | 0.15 |
| Cleanability (%) | 65 | 70 | 98 | 100 | 96 | 100 |

As the results in Table 3 clearly show, neither the torque nor cleanability of Sample 1 is improved. Further, a comparison between Sample 3 and Sample 4 shows that the torque of Sample 3 exceeds the specifications (0.25 N·cm or less) because of the use of a cleaning member with a high density of 0.11 g/cm³ at a load of 4.4 kg/cm², and that Sample 3 also has a poorer cleanability than Sample 4. This takes into consideration the facts that the dust which escapes cleaning causes a disk error, and the significance of the difference in the rate of collection between 100% for Sample 4 and 98% for Sample 3 is greater than the numbers suggest.

In addition, making a comparison between Sample 4 and Sample 5, it is apparent that the density is acceptable in the two samples, whereas the torque of Sample 5 exceeds the specifications because of the low rate of change of density, $2.8 \times 10^{-3}$ (g/cm³)/(gf/cm²).

Compared to Sample 3, Sample 2 with a smaller thickness provides a more appropriate torque, but produces a poorer cleanability. Sample 4 and Sample 6 are excellent as regards both the cleanability and the torque.

The invention being thus described, it will be obvious that the same may be varied in many ways. Such variations are not to be regarded as a departure from the spirit and scope of the invention, and all such modifications as could be obvious to one skilled in the art are intended to be included within the scope of the following Claims.

What is claimed is:

1. A disk cartridge adapted to house a magnetic disk, said disk cartridge containing at least one cleaning member disposed therein for sliding engagement with the magnetic disk for the collection of debris from the surface thereof, said cleaning member adapted to minimize variations in torque on the magnetic disk and comprising a sheet-like fibrous nonwoven fabric comprising fibers having a thickness of 0.5 to 5 deniers; the quantity of the fibers used is 10 to 35 g/m²; the density of the nonwoven fabric is 0.05 to 0.10 g/cm³ at a load of 4.4 gf/cm²; the nonwoven fabric having a rate of change of the density over a load range of 0.1 to 4.4 gf/cm² of from $7.0 \times 10^{-3}$ to $1.6 \times 10^{-2}$ (g/cm³)/(gf/cm²).

2. The disk cartridge of claim 1, comprising top and bottom shells, the inner surface of at least one of said shells containing the cleaning member.

* * * * *